United States Patent [19]
Robbins

[11] 4,040,197
[45] Aug. 9, 1977

[54] AUTOMATIC FISHING POLE HOLDER

[75] Inventor: Daniel T. Robbins, Burbank, Calif.

[73] Assignees: Danny Joel Robbins; Stanley M. Brown, both of Newhall, Calif.

[21] Appl. No.: 644,377

[22] Filed: Dec. 29, 1975

[51] Int. Cl.² ............................................. A01K 97/10
[52] U.S. Cl. ........................................................ 43/15
[58] Field of Search ..................................... 43/15, 16

[56] References Cited

U.S. PATENT DOCUMENTS

| | | | |
|---|---|---|---|
| 2,482,999 | 9/1949 | Bean | 43/15 |
| 3,205,606 | 9/1965 | Banta et al. | 43/15 |
| 3,410,015 | 11/1968 | Garcia, Jr. | 43/15 |
| 3,897,646 | 8/1975 | Sheets | 43/15 |
| 3,977,117 | 8/1976 | Zahner | 43/15 |

*Primary Examiner*—Louis G. Mancene
*Assistant Examiner*—Peter K. Skiff
*Attorney, Agent, or Firm*—Jessup & Beecher

[57] ABSTRACT

A fishing pole holder which will support the pole while fishing and will automatically raise the pole to a substantially vertical position when there is a pull on the fishing line. The holder is comprised of a frame and a rotating plate having a cradle for the fishing pole handle attached to the frame. A gravity-operated trigger plate has a tang or finger which engages a detent or notch in the pole cradle plate to arm the device. A tension spring engaging the cradle plate will jerk the fishing pole to an upright position when the trigger is released by a pull on the fishing line. The lower part of the frame provides a thumbscrew and post for detachably connecting a sandspike or a clamp, depending upon the particular type of fishing being engaged in.

7 Claims, 9 Drawing Figures

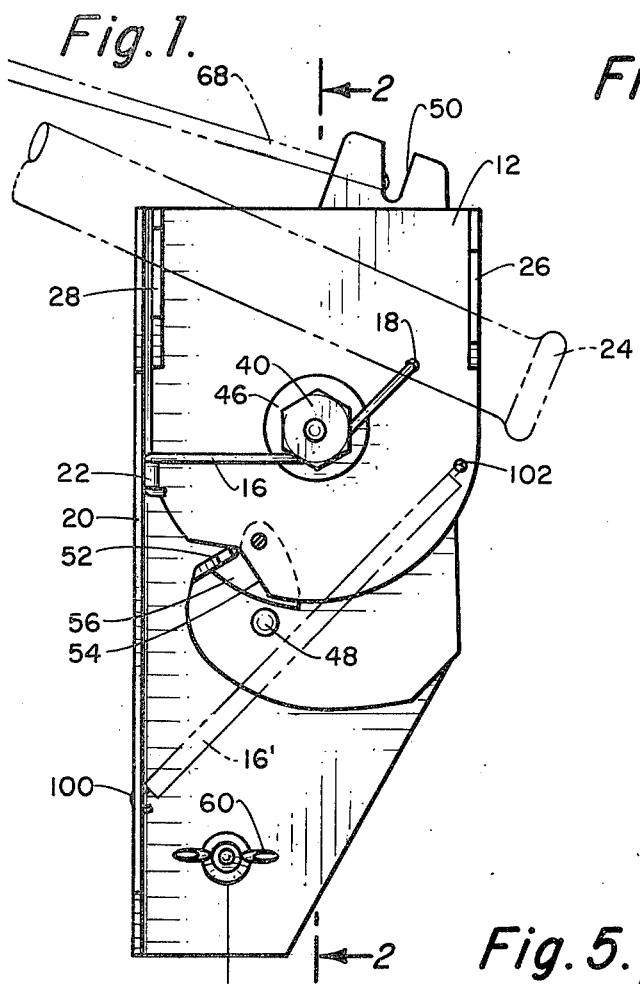
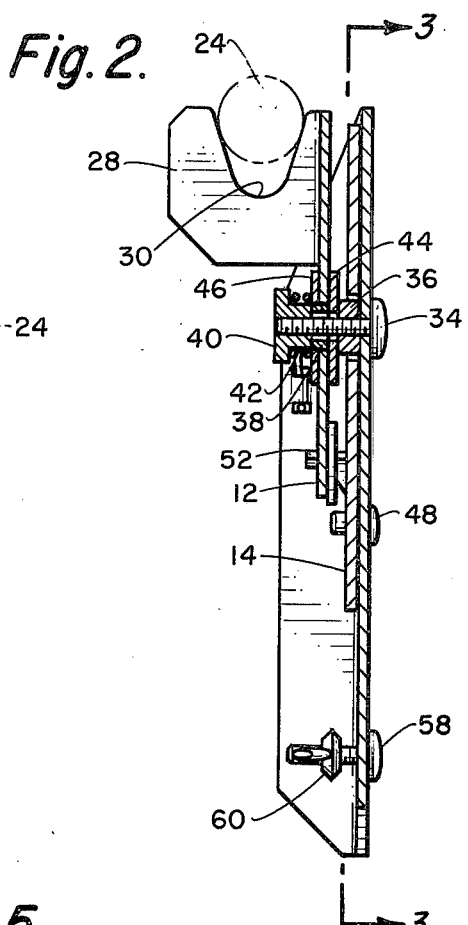
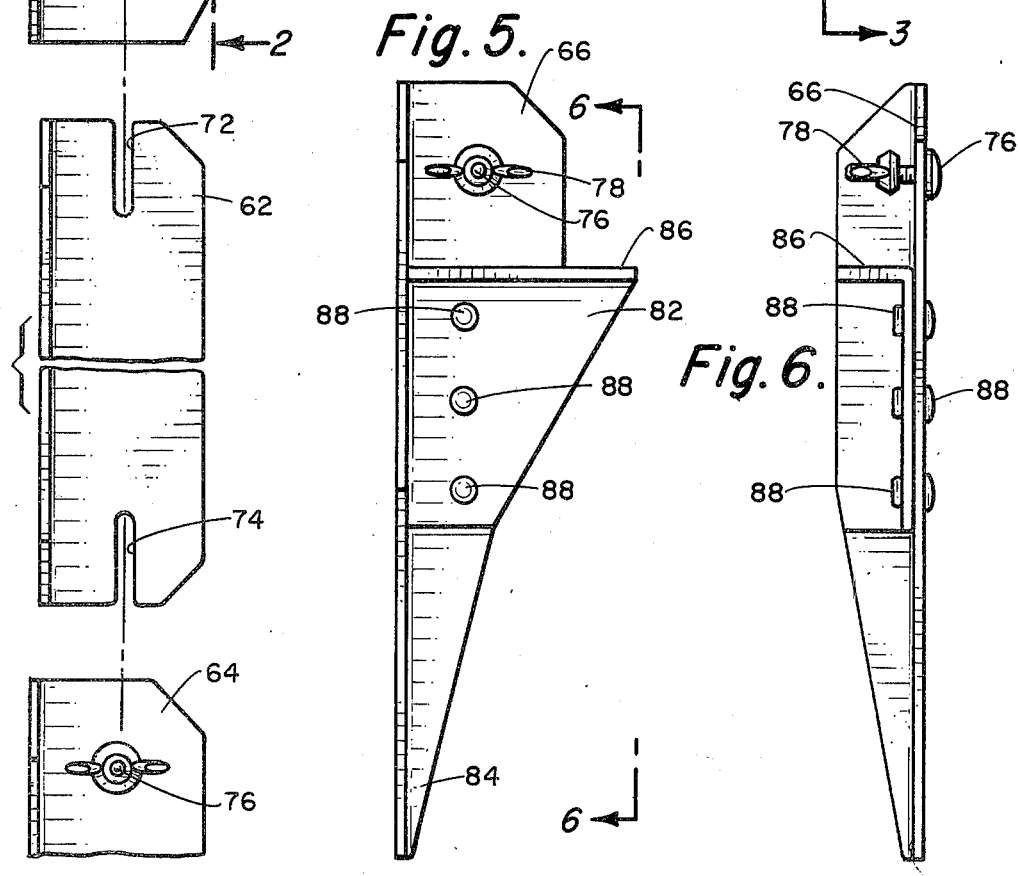

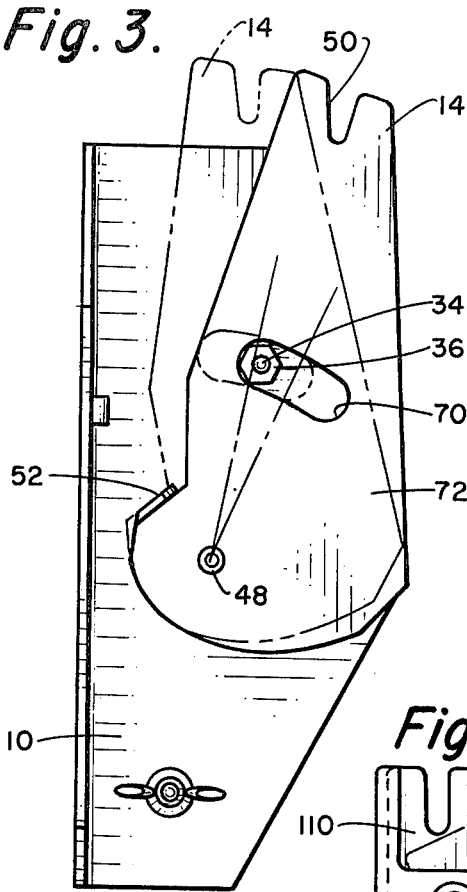
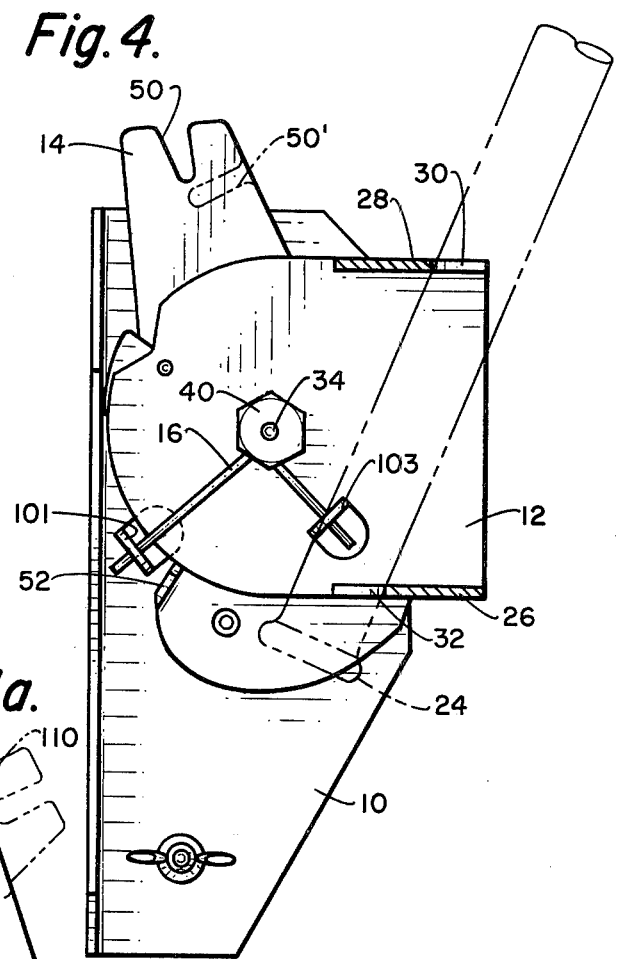
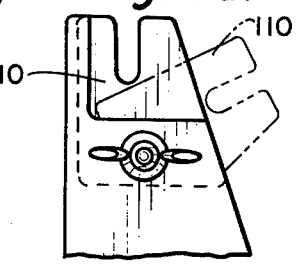
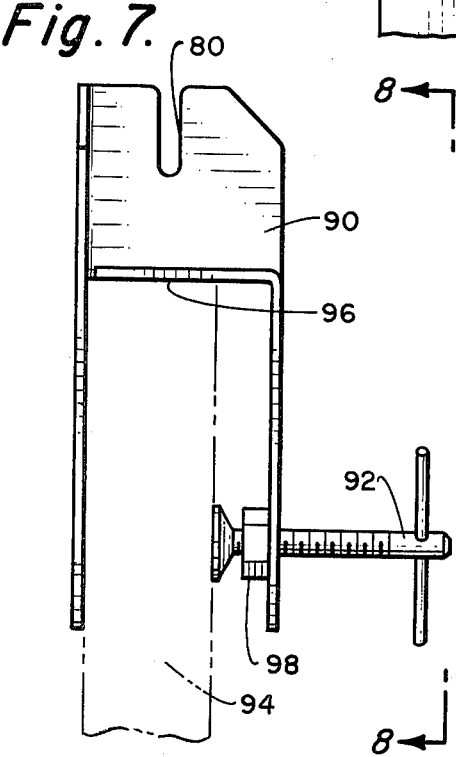
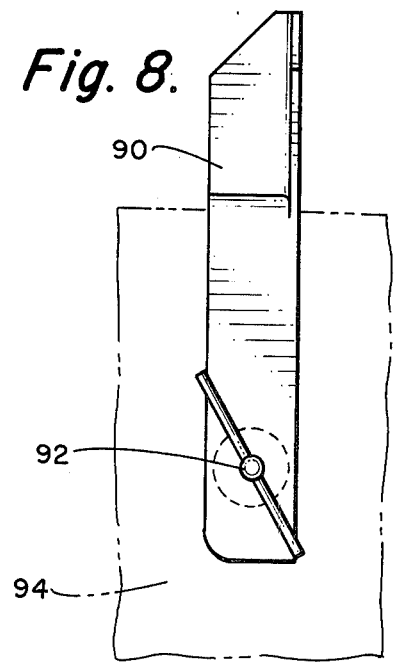

AUTOMATIC FISHING POLE HOLDER

BACKGROUND OF THE INVENTION

This invention relates generally to fishing pole holders, and more particularly relates to a fishing pole holder which automatically raises the pole to set a hook when a pull is experienced on a fishing line.

Fishing pole holders are well known in the art and there are also several which contemplate automatically setting a hook when a fish is caught. However, these devices are generally complicated and have a number of rotatable parts and springs which increase the expense of making them as well as making failures much more common. The number of parts and complexity of the devices have resulted in their not being very widely accepted.

SUMMARY OF THE INVENTION

The purpose of the present invention is to provide a fishing pole holder which is uncomplicated and simple in design, but is very effective in use.

The present invention solves most of the problems attendant with prior art devices in that it provides a cradle for a fishing pole holder rotatably mounted on a frame which can be used with a sand spike or with a clamp by simply exchanging detachable parts. The cradle is provided with a detent for arming the devices when a fishing pole is mounted in the cradle. The pole is mounted in the cradle and the plate rotated until the gravity-operated trigger engages the detent locking the fishing pole in a substantially horizontal position with the fishing line in the water. The fishing line then engages a slot in one end of a trigger plate to set the device for use. A tug or pull on the fishing line moves the trigger plate which releases the cradle plate, which is under tension from a torsion spring, causing the fishing pole to be jerked to an upright position, thus setting the hook in a fish. The frame is provided with a wing nut and post for detachably connecting any particular type of device according to the particular type of fishing being engaged in. For example, if the fishing is on a pier or a boat, a clamp can be attached to the frame of the fishing pole holder. If the fishing is surf fishing or river fishing, a spike can be attached for standing the fishing pole holder upright in the ground.

It is one object of the present invention to provide an automatic fishing pole holder which is uncomplicated in construction and easy to use.

Another object of the present invention is to provide a fishing pole holder which has an automatic setting gravity-operated trigger.

Another object of the present invention is to provide a fishing pole holder which automatically raises the fishing pole when a pull is experienced on the line.

Still another object of the present invention is to provide a fishing pole holder which can be adapted for use on the ground or on a platform.

Still another object of the present invention is to provide a fishing pole holder which automatically raises the pole to set the hook having an adjustable trigger notch angle.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 1 is a side elevation of the fishing pole holder illustrating the manner in which parts are detachable.

FIG. 2 is a sectional view of the fishing pole holder taken at 2—2 of FIG. 1.

FIG. 3 is a sectional view of the fishing pole holder taken at 3—3 of FIG. 2, illustrating the trigger mechanism.

FIG. 4 is a side elevation of the fishing pole holder illustrating the manner in which it operates.

FIG. 4a is a partial view showing a variation of the invention.

FIG. 5 is a side elevation of a sand spike for use with the fishing pole holder of FIG. 1.

FIG. 6 is a view of the sand spike of FIG. 5 taken at 6—6.

FIG. 7 illustrates a clamping base for use with the fishing pole holder of FIG. 1.

FIG. 8 is a view of the clamping base shown in FIG. 7 taken at 8—8.

DETAILED DESCRIPTION OF THE PREFERRED EMBODIMENT

Referring now to FIG. 1, there is shown a fishing pole holder which is comprised of a frame 10, a rotatable cradle plate 12, and a trigger plate 14 attached to the frame 10. The cradle rotatable plate 12 is biased by a torsion spring 16 engaging the plate at 18 and a flange 20 on the frame 10 at a hanger 22. The rotatable cradle plate provides support for a fishing rod 24 by bent flanges 26 and 28 which have rounded slots 30 oppositely directed. That is, the slot 30 in flange 28 points upward, while the slot 32 (FIG. 4) in flange 26 points downward. Thus, the fishing pole handle 24 is easily fixedly retained in the cradle formed by flanges 26 and 28.

The cradle plate 12 is rotatably mounted on an axle comprised of a screw 34 having a retaining nut 36, a bushing 38 and a clamping nut 40. The clamping nut 40 has a neck 42 which provides a bushing for the torsion spring 16. The nut 40, when threaded on the screw 34, clamps the bushing 38 between a washer 44 and nut 40. Washer 46 is retained by the torsion spring 16 between the washer and the head of the clamping nut 40.

The trigger plate 14 is pivotally mounted by a rivet 48 and has a slot 50 for engaging a fishing line at the upper end and a latch or tang 52 for engaging a detent or notch 5 in the cradle plate 12. The force required to release the latch 52 of trigger 14 is adjusted by means of a trip angle adjusting plate 56 attached to the cradle plate 12. Of course, the angle of the notch or detent 54 could be fixed if desired. In order to permit attachment of the fishing holder to various devices, a post 58 is provided with a wing nut 60. This arrangement permits attachment of an extension 62 with any other suitable device 64, such as a sand spike 66, as shown in FIG. 5.

FIG. 1 illustrates the fishing pole holder in the armed position with the fishing rod 24 in a substantially horizontal position. The device is armed by engaging the cradle flanges 26 and 28 with the handle of the fishing pole 24 and by leverage rotating the cradle plate 12 until the latch 52 of the trigger 14 engages the detent 54. This produces a tension on torsion spring 16. A fishing line coming from the fishing reel on the pole (not shown) can then be dropped into the slot 50 of the trigger plate 14. A force on the fishing line 68 then would force the trigger plate 14 to the left, releasing the latch 52 from the detent 54 in the cradle plate 12, causing the device to jerk the fishing pole 24 into the upright position, as is shown in FIG. 4. In this position the torsion spring 16 is in an untensioned condition. An additional advantage of the adjustable trigger plate 56 is that wear, even though relatively slow, can be compensated for between the latch 52 and the detent 54.

An important feature of the invention is that when the fishing line has been cast in the water and the pole is set in the cradle flanges 26 and 28 and rotated to a horizontal positon, as shown in FIG. 1, the trigger 14 will automatically engage (i.e. drop into) the detent 54 by force of gravity. This is illustrated more clearly in the detail drawing of FIG. 3 in which the cradle plate 12 has been omitted for clarity. The trigger plate 14 is riveted at a pivot point 48 which provides a center of gravity of the plate 14 substantially to the right of screw 34 when the frame 10 is in a substantially vertical position. Thus, when the cradle plate 12 is rotated counterclockwise, the trigger plate 14 will fall with the latch 52 engaging the detent 54. A slot 70, which is somewhat curved, permits the trigger plate 14 to pass over the nut 36 on screw or post 34. The nut 36 acts as a stop, limiting the trigger plate 14 from moving to the left to maintain the center of gravity to the right of the post 34.

Referring to FIG. 4, the trigger plate 14 will be in the position shown after the cradle plate 12 has been tripped to release the latch 52, jerking the fishing pole 24 to a substantially vertical position. When the fishing pole is again engaged in the cradle flanges 26 and 28, and the cradle plate 12 is rotated counterclockwise until the detent 54 passes the latch 52 on the trigger, the trigger plate 14 will automatically fall backward, causing the trigger latch 52 to engage the notch 54. This is again illustrated in FIG. 3 in which the phantom outline of trigger plate 14 shows it when the latch 52 is disengaged and shows it solid when the trigger notch 54 has passed beyond trigger latch 52, causing the two to engage, thus arming the device. The enlarged portion 72 of the trigger acts as a counterweight to cause the trigger plate 14 to rotate clockwise on its pivot point 48, causing the automatic engagement of the notch 54.

There are two possible variations of the trigger slot 50. These involve ways to vary the slot angle for the type of fishing and the particular trigger setting tension being set by plate 56. The trigger slot 50 could be angled completely rearward as shown by dotted lines 50' in FIG. 4. Another alternative would be to provided a variable slot by using a movable plate 110 (FIG. 4a). The rear facing slot would be no problem because the slot would move to the left while the pole 24 would rotate to the right pulling the line from the slot.

FIG. 4 also shows a variation for mounting spring 16'. Ears 101 and 103 would be shear formed in frame 10 and rotatable cradle plate 12. The straight ends 106 and 108 of spring 16' would then engage holes in the ears 100 and 102 respectively. This would eliminate the necessity of providing hooked ends to the spring 16 simplifying the assembly as well as being more economical.

In order to make the device more compact and versatile, the frame 10 was provided with a post 58 and wing nut 60 for attachment of various accessories. As shown in FIG. 1, an extension 62 of any length can be attached to the frame and then various devices attached to the lower end of extension 62. Thus the extension 62 is provided with slots 72 and 74 for engaging the post 58 on the frame 10 and a second post 76, on the accessory 64. The accessory may be a sand spike 66, as shown in FIG. 5, or a clamping base as shown in FIG. 7. If a sand spike 66 is used with an extension 62, then the additional post 76 and a wing nut 78 is provided. Alternatively a sand spike 66 could be provided with a slot, such as is shown at 80 or 72, with the extension. Numerous variations for attaching and detaching accessories are possible. The sand spike 66 is provided with a foot pad or step 82 for driving the pointed portion 84 of the sand spike into the ground. The foot pad 82 is a plate bent to provide a flange 86 and is attached to the sand spike 66 by rivets 88.

When the device is used on a pier, wharf or boat or other platform, a base 90 may be attached to the frame 10 and is shown in FIG. 7. The clamping base 90 has a compression screw 92 provided for clamping the base against a boat or board 94. The clamping base 90 can be provided simply by a U-shaped channel having a portion of its flange sheared and bent down as shown at 96 with the compression screw 92 threaded through a nut 98 attached to one of the flanges. Of course, the clamping base 90 could be provided with a post and wing nut as is shown at 76 of FIG. 1, if desired.

The use of the post 58 and wing nut 60 on the frame 10 permits the use of a number of various accessories, if desired. For example, the clamping base 90 could be a ball-and-socket swivel-type arrangement, if desired. Another variation of the device is shown in phantom in FIG. 1. Instead of the torsion spring 16 engaging the hanger 22, and being mounted on the bushing of the nut 40, a coil spring 16' outlined in phantom could engage the flange at 100 and be attached to the cradle plate 12 at 102, as shown. The torsion spring 16 is, however, preferred because it is permanently held in place and cannot be easily disengaged. The post 58 and wing nut 60 on the frame 10 of the fishing pole holder can be adapted to any number of accessories, such as a tubular member for engaging the socket of a fishing pole holder on a fishing swivel chair of a boat, if desired. Finally, it is obvious that the invention can be made right or left-handed which means the cradle plate 12 would have opposite rotation.

Obviously, many modifications, variations of the present invention are possible in the light of the above teachings. It is therefore to be understood that the full scope of the invention is not limited to the details disclosed herein, but may be practiced otherwise than as specifically described.

What is claimed is:

1. A fishing rod holder and triggering device comprising:
   a frame;
   cradle support means rotatably attached to said frame for supporting a fishing rod, said cradle means comprising:
   a flat plate;
   means rotatably attaching said plate to said frame;
   a pair of flanges extending outward from opposite edges of said plate;
   cradling means in each flange for cradling a fishing rod;
   biasing means for rotatably biasing said cradle support means;
   trigger latching means for latching said cradle means in a biased position, said trigger latching means comprising;
   a counterweighted plate secured to said frame beneath said cradle means;

a tang extending outward from said counterweighted plate;

a detent in the edge of said cradle means being engage and latched by the tang;

mounting means for pivotally mounting said trigger latching means at a point spaced from its center of gravity;

limiting means for limiting the rotational movement of said center of gravity so that said trigger latching means will automatically latch said cradle means after a predetermined amount of rotation, said limiting means comprising;

an arcuate slot in said counterweighted plate;

bearing means on said rotatably attaching means between the cradle means and frame;

said bearing means passing through said arcuate slot for guiding said counterweighted plate; and slot means on said trigger latching means for engaging a fishing line whereby a pull on said fishing line trips said trigger latching means, releasing said cradle means causing a sudden jerk on said fishing line.

2. The apparatus according to claim 1, wherein:

said counterweighted plate extends above the top edge of said frame;

said frame line engaging slot is in the upper edge of said extension.

3. The apparatus according to claim 1 wherein the angle of said fish engaging slot is adjustable.

4. The apparatus according to claim 1 wherein said biasing means comprises:

a torsion spring, one end of said spring being attached to said plate and the other end being attached to said frame.

5. The apparatus according to claim 4 wherein:

said torsion spring coil is supported on a bushing secured on said rotatable attaching means, one end of said spring engaging an ear on said plate and the other end engaging an ear on said frame.

6. The apparatus according to claim 1 wherein said biasing means comprises:

a coil spring, one end of said spring being attached to a point on said plate away from the point of rotation and the other end of said spring being attached to said frame.

7. The apparatus according to claim 1 including:

removable support means on said frame for supporting said holder in a substantially upright position.

* * * * *